(12) United States Patent
Son et al.

(10) Patent No.: US 7,727,648 B2
(45) Date of Patent: Jun. 1, 2010

(54) NON-REACTIVE FUEL DISSOLUTION APPARATUS AND FUEL CELL SYSTEM HAVING THE SAME

(75) Inventors: In-Hyuk Son, Suwon-si (KR); Ju-Yong Kim, Suwon-si (KR); Dong-Uk Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1130 days.

(21) Appl. No.: 11/365,106

(22) Filed: Feb. 28, 2006

(65) Prior Publication Data

US 2006/0194083 A1    Aug. 31, 2006

(30) Foreign Application Priority Data

Feb. 28, 2005   (KR) ............... 10-2005-0016508

(51) Int. Cl.
  *H01M 8/02*   (2006.01)
  *H01M 8/04*   (2006.01)
  *B01D 47/02*  (2006.01)

(52) U.S. Cl. ............... 429/19; 429/34; 96/329

(58) Field of Classification Search ........... 429/19, 429/34; 96/329
See application file for complete search history.

(56) References Cited

U.S. PATENT DOCUMENTS 6,376,114 B1 *   4/2002   Bonville et al. ............... 429/19

FOREIGN PATENT DOCUMENTS

| CN | 1428884 A    | 7/2003  |
|----|--------------|---------|
| JP | 11-265725    | 9/1999  |
| JP | 2003-123815  | 4/2003  |
| JP | 2003-187832  | 7/2003  |
| JP | 2004-171866  | 6/2004  |
| JP | 2004-349212  | 12/2004 |

* cited by examiner

*Primary Examiner*—Gregg Cantelmo
(74) *Attorney, Agent, or Firm*—Christie, Parker & Hale, LLP

(57) ABSTRACT

A fuel cell system includes a stack which generates electric energy through a reaction of hydrogen and oxygen and discharges moisture generated from the reaction of the hydrogen and oxygen, a reformer which generates a reforming gas containing hydrogen through a reforming reaction using thermal energy and discharges the reforming gas along with a non-reactive fuel component, a carbon monoxide purifier which reduces a concentration of carbon oxide contained in the reforming gas through a preferential oxidation reaction of the carbon monoxide contained in the reforming gas, and a non-reactive fuel dissolution apparatus which is connected to the stack and the reformer to dissolve the non-reactive fuel component of the reforming gas with the moisture from the stack and supply the reforming gas to the carbon monoxide purifier with the non-reactive fuel component substantially removed.

15 Claims, 5 Drawing Sheets

NON-REACTIVE FUEL DISSOLUTION APPARATUS AND FUEL CELL SYSTEM HAVING THE SAME

CROSS REFERENCE TO RELATED APPLICATION

This application claims priority to and the benefit of Korean Patent Application No. 10-2005-0016508 filed on Feb. 28, 2005 in the Korean Intellectual Property Office, the entire content of which is incorporated herein by reference.

FIELD OF THE INVENTION

The present invention relates to a fuel cell system, and more particularly, to a non-reactive fuel dissolution apparatus for dissolving non-reactive components of a fuel discharged from a reformer.

BACKGROUND OF THE INVENTION

A fuel cell system is an electricity generating system which directly converts the chemical reaction energy of oxygen and hydrogen contained in a hydrocarbon material such as methanol into electrical energy.

A fuel cell system often uses hydrogen generated by reforming methanol or ethanol as the fuel, and has a wide range of applications which include mobile power sources for vehicles, distributed power sources for homes or buildings, and small-sized power sources for electronic apparatuses.

A fuel cell system basically includes a stack, a fuel processing unit, a fuel tank, and a fuel pump. The fuel processing unit includes a reformer which reforms the fuel through a catalytic reforming reaction using thermal energy to generate a reforming gas containing hydrogen, and a carbon monoxide purifier which reduces the carbon monoxide concentration of the reforming gas by preferentially oxidizing the carbon monoxide. One example of a carbon monoxide purifier is a preferential CO oxidation (PROX) reactor which is well-known in the art.

In the fuel cell system, the fuel pump operates to supply the fuel stored in the fuel tank to the reformer. The reformer reforms the fuel to generate the reforming gas. The carbon monoxide purifier reduces the concentration of carbon monoxide contained in the reforming gas.

The reforming gas in which the concentration of carbon monoxide has been reduced is supplied to the stack along with air supplied through an air pump. In the stack, an electrochemical reaction of the oxygen contained in the air and the hydrogen contained in the reforming gas generates electrical energy.

However, in a conventional fuel cell system, the reformer cannot completely reform the entire fuel, and thus, a non-reactive component of the fuel is discharged along with the reforming gas. The reforming gas and the non-reactive fuel component are transferred from the reformer to a carbon monoxide purifier.

In the carbon monoxide purifier, the non-reactive portion of the fuel may oxidize with oxygen, generating unnecessary heat. The unnecessary heat can reduce the activity of the PROX reaction in the carbon monoxide purifier. In addition, a methane forming reaction may occur, consuming the reforming gas, or the carbon monoxide purifier may be damaged.

SUMMARY OF THE INVENTION

The present invention provides a non-reactive fuel dissolution apparatus for removing a non-reactive component of the fuel discharged form a reformer with moisture discharged from a stack to prevent the non-reactive fuel component from being supplied to the carbon monoxide purifier. According to this specification, the term "non-reactive" when referring to a non-reactive component of the reforming gas does not mean the component is entirely non-reactive or inert, but rather that it has not taken part in the reforming reaction. It should also be noted that when the non-reactive component is described as being "removed," complete removal is not intended, but rather, by using this term, it is intended that at least some significant portion of the non-reactive component is removed.

The present invention also provides a fuel cell system which includes the non-reactive fuel dissolution apparatus.

According to an embodiment of the present invention, a non-reactive fuel dissolution apparatus is connected to a reformer and a stack to remove the non-reactive fuel components that are discharged from the reformer by dissolving such components in moisture that has been discharged from the stack. The apparatus includes a dissolution container having a space for containing the non-reactive fuel components and the moisture. The container is connected to a moisture discharge port of the stack and a reforming gas discharge port of the reformer.

According to this embodiment of the present invention, the dissolution container may include a first inlet port connected to the moisture discharge port of the stack and a second inlet port connected to the reforming gas discharge port of the reformer.

In addition, the dissolution container may be connected to a carbon monoxide purifier to which the reforming gas is supplied after the non-reactive fuel component has been removed by the dissolution container.

According to this embodiment, the dissolution container includes a discharge port connected to a reforming gas injection port of the carbon monoxide purifier.

According to another embodiment of the present invention, a fuel cell system is provided including a stack which generates electric energy through a reaction of hydrogen and oxygen, and which discharges moisture generated from the reaction of the hydrogen and oxygen. The fuel cell system further includes a reformer which generates a reforming gas containing hydrogen and discharges the reforming gas which includes a non-reactive fuel component. The fuel cell system still further includes a non-reactive fuel dissolution apparatus which is connected to the stack and the reformer to remove the non-reactive fuel component from the reforming gas using moisture from the stack. After the non-reactive fuel component has been removed from the reforming gas, the reforming gas passes through a carbon monoxide purifier to reduce the concentration of carbon monoxide contained in the reforming gas through a preferential oxidation reaction of the carbon monoxide. The reforming gas from the carbon monoxide purifier is then fed to the stack of the fuel cell system.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Now, embodiments of the present invention will be described with reference to the accompanying drawings in detail so as to be easily implemented by one of ordinary skill in the art. Because the present invention can be implemented in various forms, the present invention is not limited to the embodiments described below.

Figure 1:
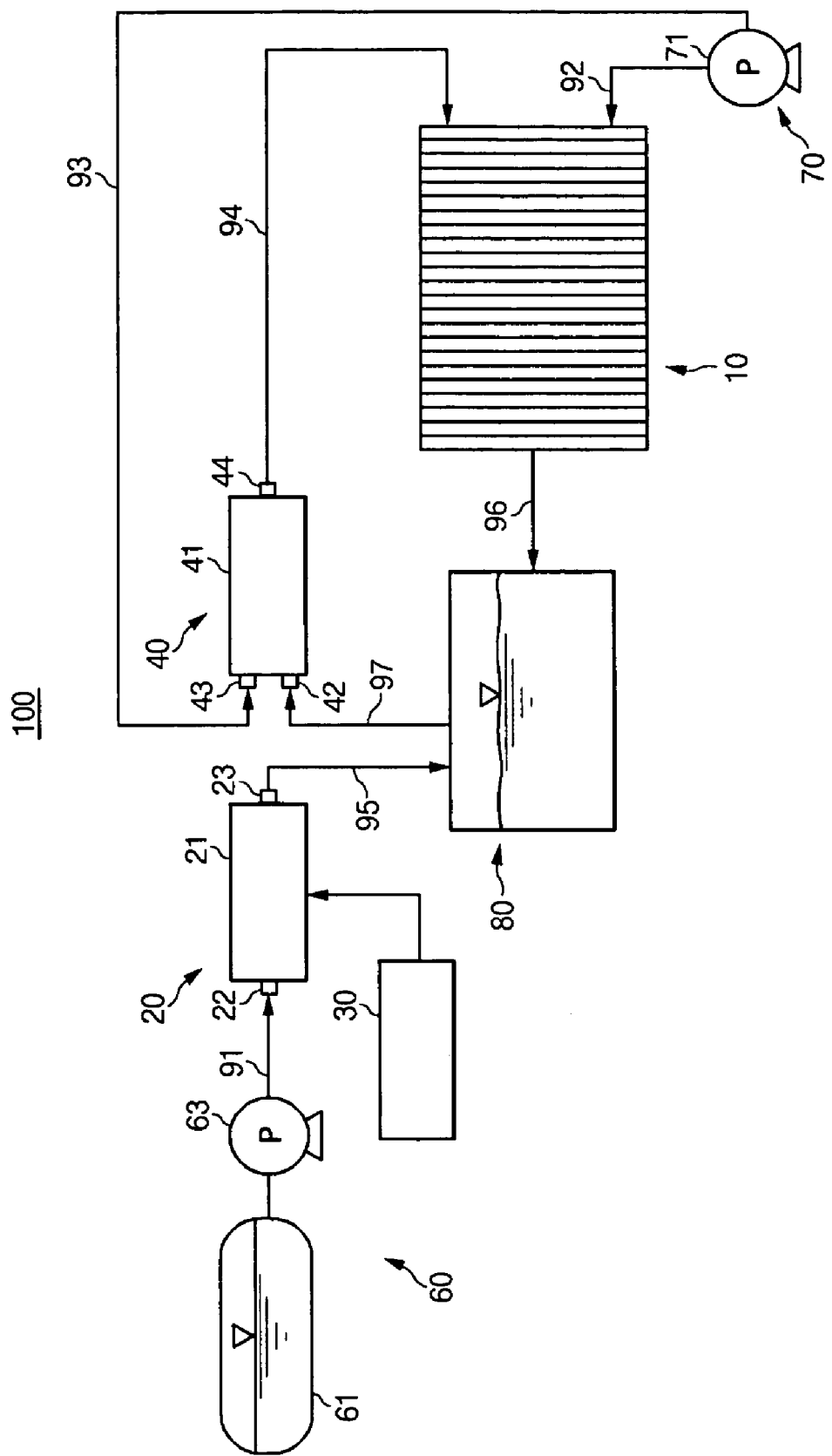
FIG. 1 is a schematic block diagram showing a fuel cell system according to an embodiment of the present invention.

FIG. 1 is a schematic block diagram showing a fuel cell system according to an embodiment of the present invention.

Referring to FIG. 1, the fuel cell system 100 reforms a fuel containing hydrogen to produce a reforming gas, and employs a polymer electrode member fuel cell (PEMFC) which performs electro-chemical reaction of the hydrogen from the reforming gas and an oxidant gas to generate electrical energy.

In the fuel cell system 100, the fuel used to generate electricity may be a liquid or gaseous fuel such as methanol, ethanol, or natural gas, or may be hydrogen generated by reforming such a fuel. In the embodiments illustrated, the use of liquid fuel is exemplified.

Oxygen gas stored in a separate storage unit, or air containing oxygen can be used as the oxidant gas. In the embodiments illustrated, the use of air is exemplified.

The fuel cell system 100 includes a stack 10 which generates electrical energy through the electro-chemical reaction of hydrogen and oxygen, a reformer 20 which generates the reforming gas containing the hydrogen from the liquid fuel through a catalytic reforming reaction using thermal energy, a burner 30 which generates the thermal energy and supplies the thermal energy to the reformer 20, a carbon monoxide purifier 40 which reduces the concentration of carbon monoxide contained in the reforming gas and supplies the reforming gas to the stack 10, a fuel supply unit 60 which supplies the fuel to the reformer 20, and an oxygen supply unit 70 which supplies oxygen to both the carbon monoxide purifier 40 and the stack 10.

The stack 10 is a fuel cell which generates electrical energy through the Electro-chemical reaction of the reforming gas supplied by the reformer 20 via the carbon monoxide purifier 40, and the oxygen supplied by the oxygen supply unit 70.

Figure 2:
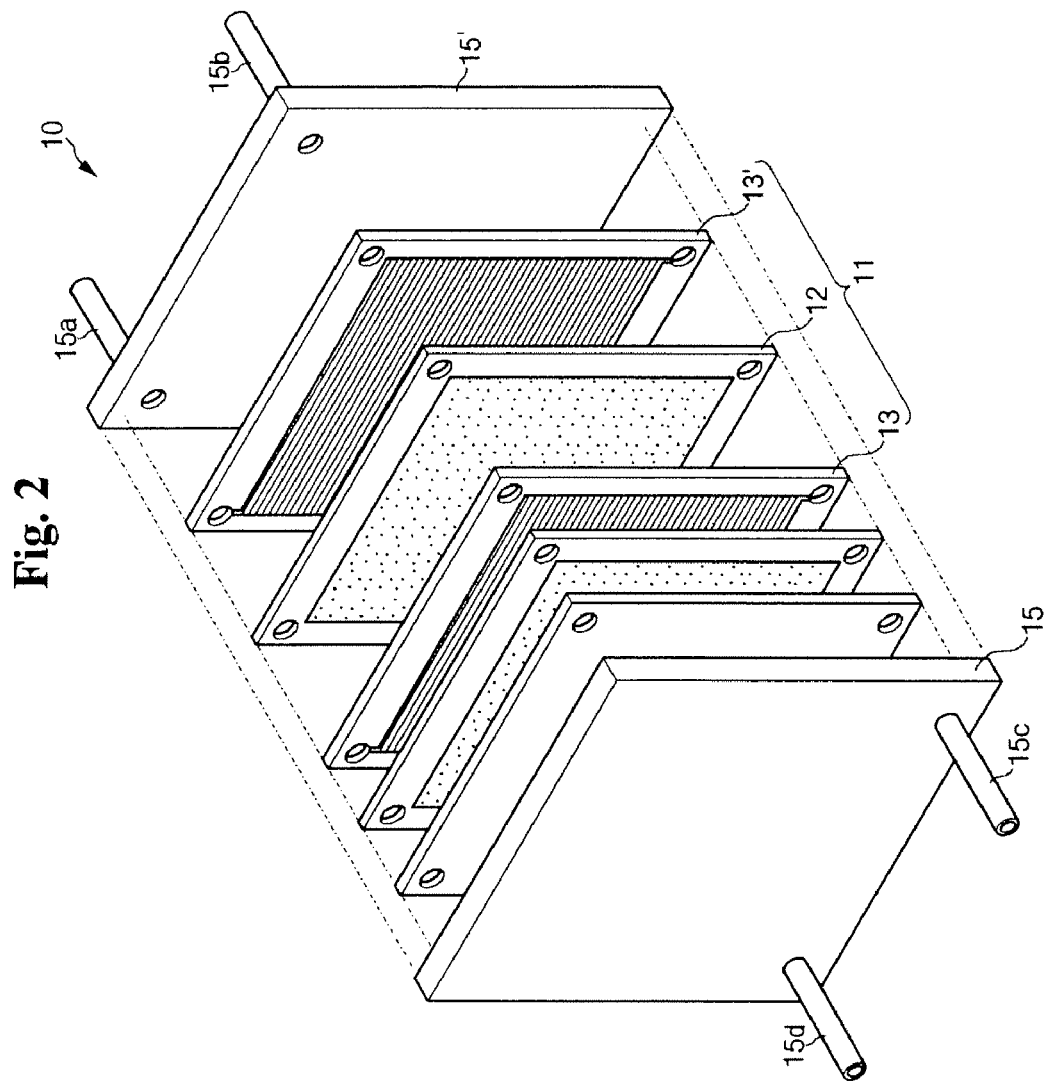
FIG. 2 is a perspective exploded view of the stack of FIG. 1.

FIG. 2 is a perspective exploded view showing the construction of the stack shown in FIG. 1.

Referring to FIG. 2, the stack 10 may have an electricity generation assembly constructed by sequentially disposing a plurality of electricity generators 11 in close contact with each other. Here, a single electricity generator 11 constitutes a unit cell for generating the electrical energy.

More specifically, each of the electricity generators 11 includes a membrane electrode assembly (MEA) 12 and separators 13 and 13' (or bipolar plates) disposed in close contact with both surfaces of the membrane electrode assembly 12.

The MEA 12 has an active region where the electro-chemical reaction of the hydrogen and the oxygen occurs and includes anode and cathode electrodes disposed on both sides thereof and an electrolyte membrane interposed between the electrodes.

The anode electrode includes a catalyst layer which decomposes the reforming gas supplied by the reformer 20 into hydrogen ions (protons) and electrons, and a gas diffusion layer which facilitates movement of the electrons and the reforming gas.

The cathode electrode includes a catalyst layer which generates thermal energy and moisture at a predetermined temperature through a reaction of the oxygen supplied by the oxygen supply unit 70, the hydrogen ions, and the electrons moving from the anode electrode, and a gas diffusion layer which facilities movement of the oxygen.

The electrolyte membrane performs an ion exchange function, moving the hydrogen ions generated by the anode electrode to the cathode electrode.

The separator 13 provides a channel for supplying hydrogen to the anode electrode of the MEA 12. The separator 13' provides a channel for supplying oxygen to the cathode electrode of the MEA 12. In addition, the separators 13 and 13' function as electrical conductors for serially connecting the anode and cathode electrodes.

In addition, pressing plates 15 and 15' may be provided at the outermost sides of the stack 10 for pressing the plurality of electricity generators in close contact with one another. In addition to pressing the electricity generators 11 together, the pressing plates 15 and 15' may also function as separators.

In the present invention, the stack is not limited to the aforementioned structure. For example, the pressing plates may be omitted, and the electricity generators disposed at the outermost sides of the stack may function as the pressing plates.

In the embodiment illustrated, the pressing plates 15 and 15' are provided with a first injection port 15a through which the hydrogen is supplied, a second injection port 15b through which the oxygen is supplied, a first discharge port 15c through which the remaining hydrogen of the reaction of the electricity generator 11 is discharged, and a second discharge port 15d through which the moisture generated by the reaction of the hydrogen and the oxygen in the electricity generator 11 is discharged.

The reformer 20 may generate the reforming gas from the fuel such as through a catalytic reaction using thermal energy to supply the reforming gas containing hydrogen to the stack 10. Exemplary reactions include steam reforming reactions, partial oxidation reactions, and auto-thermal reactions.

Figure 3:
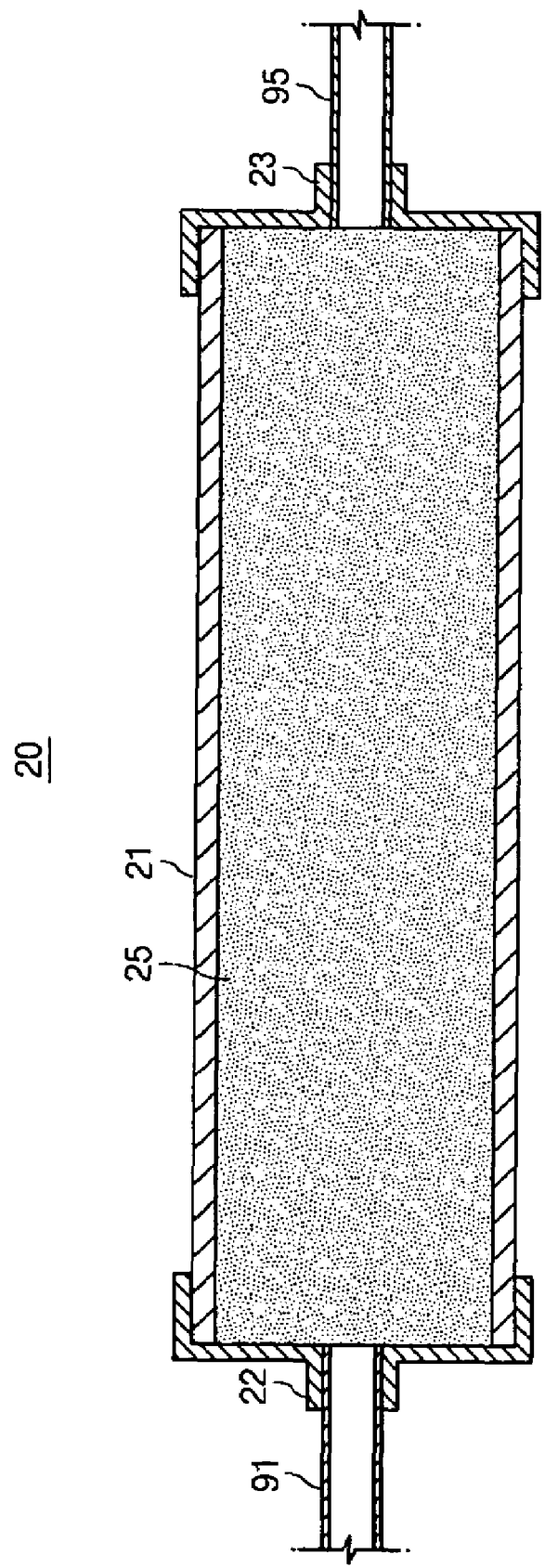
FIG. 3 is a cross sectional view of the reformer of FIG. 1.

FIG. 3 is a cross sectional view of the reformer shown in FIG. 1.

Referring to FIG. 3, the reformer 20 may include a cylindrical reformer body 21 filled with a reforming catalyst 25 for promoting the reforming reaction.

The reformer body 21 is constructed in a tubular shape with a predetermined cross sectional area, and having openings at both ends. Since the reformer body 21 of this embodiment is exposed, it is preferable that the reformer body 21 be made of a heat-insulating metal or non-metal. One end of the reformer body 21 is provided with a fuel supply port 22 through which the fuel supplied by the fuel supply unit 60 is injected into an inner space of the reformer body 21. The other end of the reformer body 21 is provided with a reforming gas discharge port 23 through which the reforming gas containing hydrogen generated through the reforming reaction is discharged.

It should be noted that the reformer body 21 is not limited to the aforementioned shape, but may be constructed in many other shapes and configurations, just one of which comprises a plate which includes a reactor substrate, one or more channels formed thereon, and a catalyst layer formed on inner surface of the channel.

The reforming catalyst 25 may be provided on a pellet-shaped carrier made of a material such as alumina ($Al_2O_3$), silica ($SiO_2$), or titania ($TiO_2$). The reforming catalyst 25 may also be provided on a honeycomb carrier structure. In the honeycomb structure, a plurality of through-holes are formed on a surface of a ceramic or metal carrier, and the reforming catalyst 25 is formed on the surfaces of the through-holes.

As shown in FIG. 1, the burner 30 which generates the thermal energy and supplies the thermal energy to the reformer 20 may be substantially connected to the reformer 20. The burner 30 burns a liquid fuel such as methanol or ethanol or a gaseous fuel such methane gas or propane gas with air through an oxidation reaction to generate the thermal energy in a predetermined temperature range.

It should be noted that the burner 30 is not limited to the oxidation-reaction structure, but may include an ignition-burning structure for igniting and burning the aforementioned fuel with the air by using a separate igniter to generate the thermal energy.

The reforming gas contains a small amount of carbon monoxide. In order to reduce the concentration of the carbon monoxide, the carbon monoxide purifier 40 employs a preferential CO oxidation (PROX) reaction using oxygen supplied by the oxygen supply unit 70.

Figure 4:
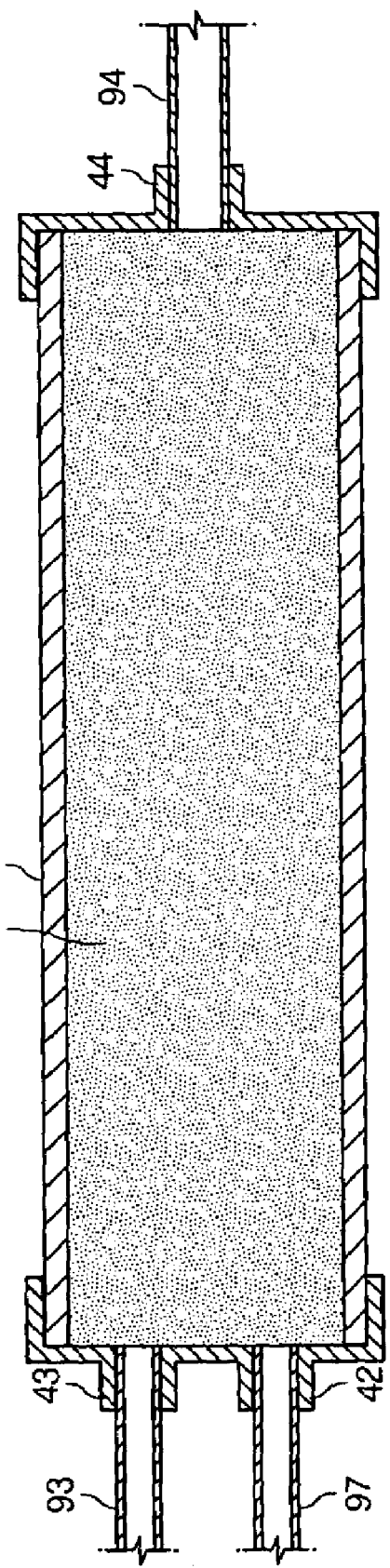
FIG. 4 is a cross sectional view of the carbon monoxide purifier of FIG. 1.

FIG. 4 is a cross sectional view showing the construction of the carbon monoxide purifier shown in FIG. 1.

Referring to FIG. 4, the carbon monoxide purifier 40 includes a cylindrical purifier body 41 having an inner space having a predetermined volume and an oxidation catalyst 45 filling the inner space of the purifier body 41.

According to this embodiment, the purifier body 41 is constructed in a tubular shape with a predetermined cross sectional area, and having both ends opened. One end of the purifier body 41 is provided with a first reforming gas injection port 42 through which the reforming gas from the reformer 20 is injected into an inner space of the purifier body 41, and a second oxygen gas injection port 43 through which the oxygen supplied by the oxygen supply unit 70 is injected into the inner space of the purifier body 41.

In addition, the other end portion of the purifier body 41 is provided with a reforming gas discharge port 44 which discharges the reforming gas after the concentration of carbon monoxide has been reduced through the preferential CO oxidation reaction of the carbon monoxide using oxygen in combination with the oxidation catalyst 45. The reforming gas discharge port 44 of the purifier body 41 and the first injection port 15a of the stack 10 may be connected to each other through a fourth supply line 94.

Similar to the reforming catalyst, the oxidation catalyst 45 which is used to facilitate the preferential CO oxidation reaction of the carbon monoxide may be provided on a pellet-shaped carrier made of a material such as alumina ($Al_2O_3$), silica ($SiO_2$), or titania ($TiO_2$), or may be provided on a honeycomb carrier structure as described above.

As shown in FIG. 1, the fuel supply unit 60 for supplying the fuel to the reformer 20 includes a fuel tank 61, and a fuel pump 63 connected to the fuel tank 61 to discharge the fuel from the fuel tank 61 to the reformer 20 through a first supply line 91.

As shown in FIG. 1, the oxygen supply unit 70 for supplying the oxygen to the stack 10 and the carbon monoxide purifier 40 includes an air pump 71 which supplies air to the second injection port 15b of the stack 10 and to the oxygen injection port 43 of the carbon monoxide purifier 40. The second injection port 15b of the stack 10 and the air pump 71 are connected to each other through a second supply line 92. The oxygen injection port 43 of the carbon monoxide purifier 40 and the air pump 71 are connected to each other through a third supply line 93.

In the embodiment shown, the air supply unit 70 includes a single air pump 71 for supplying air to both the stack 10 and the carbon monoxide purifier 40. However, the air supply unit is not limited to such a structure, and may include a first air pump for producing air to the stack 10 and a second air pump for producing air to the carbon monoxide purifier 40.

According to the present invention, the fuel cell system 100 is provided with a dissolution apparatus 80 for removing a non-reactive component of the fuel from the reforming gas. More specifically, the dissolution apparatus 80 dissolves the non-reactive fuel discharged form the reformer 20 in the moisture discharged from the stack 10, and supplies reforming gas to the carbon monoxide purifier 40 with the non-reactive components substantially removed.

Figure 5:
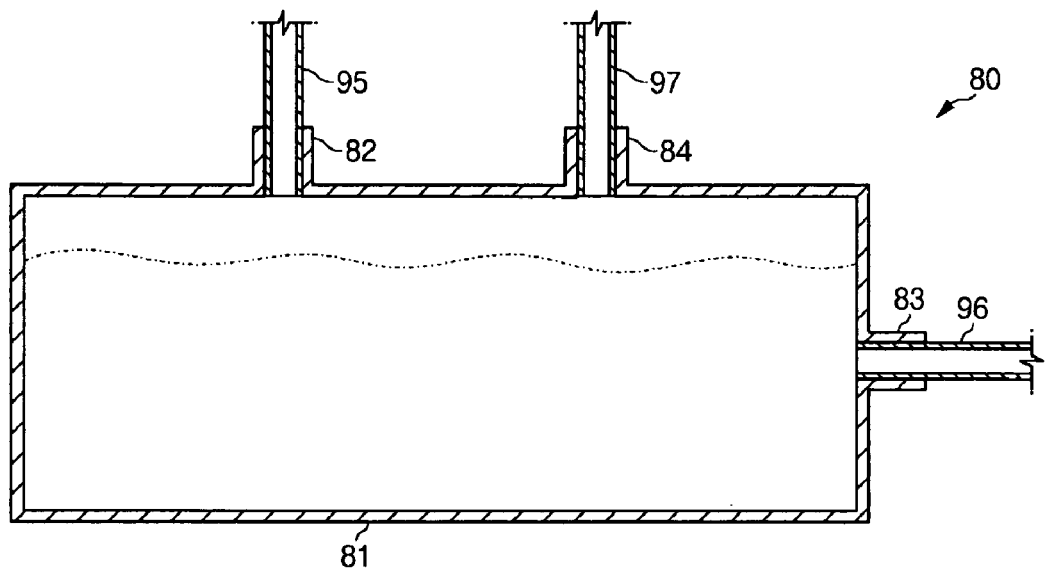
FIG. 5 is a cross sectional view of a non-reactive fuel dissolution apparatus according to an embodiment of the present invention.

FIG. 5 is a cross sectional view showing a non-reactive fuel dissolution apparatus according to an embodiment of the present invention.

Referring to FIGS. 1 and 5, the dissolution apparatus 80 includes a dissolution container 81 which is connected to the reforming gas discharge port 23 of the reformer 20, the second discharge port 15d of the stack 10, and the reforming gas injection port 42 of the carbon monoxide purifier 40.

The dissolution container 81 is constructed with a hermetically sealed container which stores moisture discharged from the second discharge port 15d of the stack 10, and removes and stores the non-reactive fuel component of the reforming gas which has been fed to the dissolution container 81 from the reforming gas discharge port 23 of the reformer 20. The non-reactive component of the reforming gas and the moisture supplied to the dissolution container 81 are maintained as a liquid state in the dissolution container while the reforming gas passes through the dissolution container 81 in a gaseous state.

The dissolution container 81 supplies a hydrogen-rich reforming gas with the non-reactive fuel component substantially removed to the carbon monoxide purifier 40. The dissolution container 81 includes a first inlet port 82 provided as an injection opening connected to the reforming gas discharge port 23 of the reformer 20, a second inlet port 83 provided as an injection opening connected to the second discharge port 15d of the stack 10, and a discharge port 84 provided as a discharge opening through which reforming gas is fed to the reforming gas injection port 42 of the carbon monoxide purifier 40 after the non-reactive fuel component has been substantially removed.

Here, the reforming gas discharge port 23 and the first inlet port 82 are connected to each other through a third supply line 95. The second discharge port 15d and the second inlet port 83 are connected to each other through a sixth supply line 96. The reforming gas injection port 42 of the carbon monoxide purifier 40 and the discharge port 84 of the dissolution container 81 are connected to each other through a seventh supply line 97.

During the operation of the fuel cell system 100 having the aforementioned construction, the stack 10 discharges the moisture generated through the reaction of the hydrogen and the oxygen in the electricity generator 11 through the second discharge port 15d. The moisture flows into the inner space of the dissolution container 81 through the sixth supply line 96 to be stored in the inner space.

The reformer 20 which is supplied with the fuel from the fuel supply unit 60 generates the reforming gas containing the hydrogen through the reforming reaction of the fuel. The reforming gas is discharged from the reformer body 21 through the reforming gas discharge port 23 to the dissolution container 81. The non-reactive component of the reforming gas which remains after the reforming reaction is supplied together with the reforming gas through the reforming gas discharge port 23 to the dissolution container 81.

After that, the non-reactive component is dissolved by the moisture in the dissolution container 81, and the reforming gas with the non-reactive component removed is supplied to the carbon monoxide purifier 40 through the seventh supply line 97. At the same time, the air pump 71 operates to supply the air to the carbon monoxide purifier 40. The carbon monoxide purifier 40 reduces the concentration of carbon monoxide contained in the reforming gas through a preferential CO oxidation reaction of the oxygen contained in the air and the carbon monoxide contained in the reforming gas and supplies the reforming gas having a reduced concentration of carbon monoxide to the electricity generator 11 of the stack.

Accordingly, the stack 10 can supply the electrical energy generated through the reaction of the hydrogen and the oxygen by the electricity generator 11 to a predetermined load, for example, to a portable electric apparatus such as a laptop computer, a personal digital assistant (PDA), or a mobile communication terminal.

The fuel cell system 100 according to the embodiment of the present invention performs a series of the aforementioned processes to dissolve the non-reactive component of the reforming gas discharged from the reformer 20 so that it is possible to prevent the non-reactive component from being supplied to the carbon monoxide purifier 40 where it can adversely affect the operating conditions of the carbon monoxide purifier 40.

When passing through the dissolution container 81, the reforming gas may also be cooled. By cooling the reforming gas supplied to the carbon monoxide purifier 40, the selectivity of the preferential CO oxidation reaction may further be improved.

Although not shown in detail in the figures, the non-reactive fuel and moisture remaining in the dissolution container 81 may be recycled to a separate tank, the existing fuel tank, or to the reformer.

Figure 6:
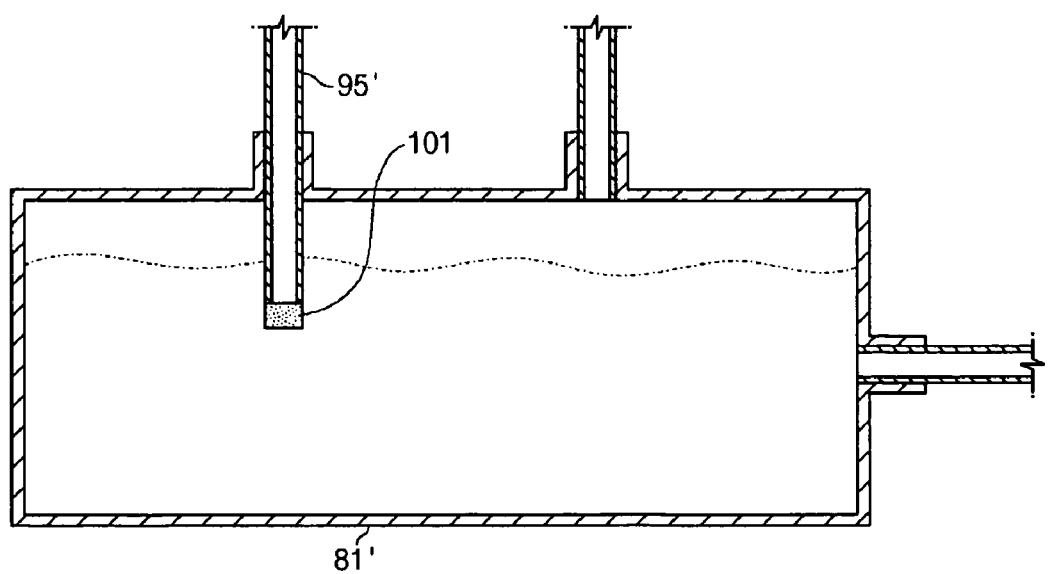
FIG. 6 is a cross sectional view of a non-reactive fuel dissolution apparatus according to another embodiment of the present invention.

FIG. 6 is a cross sectional view showing a non-reactive fuel dissolution apparatus according to another embodiment of the present invention. As shown in FIG. 6, in order to improve removal of the non-reactive component, the contact area between the moisture and the non-reactive component supplied to the dissolution container 81' may be increase by using a fifth supply line 95' which is disposed to extend into an inner portion of the dissolution container 81'. A distal end of the fifth supply line 95' may be provided with a bubbler 101 made of a porous material. By immersing the bubbler 101 in the moisture supplied form the dissolution container 81', bubbles are generated to facilitate mixing of the non-reactive component and the moisture and improve the removal of the non-reactive fuel component.

According to the present invention, a non-reactive fuel dissolution apparatus for removing a non-reactive component of the reforming gas using moisture discharged from a stack is provided to a fuel cell system, and helps prevent the non-reactive component from being supplied to the carbon monoxide purifier.

As a result, the oxidation of the non-reactive component is avoided which in turn avoids the generation of unnecessary heat in the carbon monoxide purifier. This improves the performance and prolongs the lifecycle of the carbon monoxide purifier and the fuel cell system.

Although exemplary embodiments and some modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong within the scope of the present invention.

What is claimed is:

1. A non-reactive fuel dissolution apparatus comprising a dissolution container having a space for containing a non-reactive component of a reforming gas and moisture from a fuel cell stack, the dissolution container adapted to remove the non-reactive component from the reforming gas using moisture from the fuel cell stack and produce the reforming gas from which the non-reactive component has been substantially removed to a carbon monoxide purifier.

2. The non-reactive fuel dissolution apparatus of claim 1, wherein the dissolution container further comprises:
    a first inlet port in communication with a moisture discharge port of the fuel cell stack; and
    a second inlet port in communication with a reforming gas discharge port of a reformer.

3. The non-reactive fuel dissolution apparatus of claim 1, wherein the dissolution container comprises an outlet port in communication with a reforming gas inlet port of the carbon monoxide purifier.

4. A fuel cell system comprising:
    a fuel cell stack which generates electric energy through a reaction of hydrogen and oxygen, and discharges moisture generated from the reaction of the hydrogen and oxygen;
    a reformer which generates a reforming gas containing hydrogen from a fuel through a reforming reaction and discharges the reforming gas including a non-reactive component and carbon monoxide;
    a carbon monoxide purifier which reduces a concentration of the carbon monoxide in the reforming gas through a preferential oxidation reaction of the carbon monoxide contained in the reforming gas; and
    a non-reactive fuel dissolution apparatus which is in communication with the stack and the reformer to substantially remove the non-reactive component of the reforming gas using the moisture from the stack, and which supplies the reforming gas to the carbon monoxide purifier with the non-reactive component substantially removed.

5. The fuel cell system of claim 4, wherein the non-reactive fuel dissolution apparatus comprises a dissolution container for containing the moisture, the non-reactive component, and the reforming gas, and wherein the dissolution container comprises a first inlet port in communication with a moisture discharge port of the stack, a second inlet port in communication with a reforming gas discharge port of the reformer, and a discharge port in communication with a reforming gas inlet port of the carbon monoxide purifier.

6. The fuel cell system of claim 5, further comprising:
    a fuel supply unit which supplies the fuel to the reformer; and
    an oxygen supply unit which supplies oxygen to the stack and the carbon monoxide purifier.

7. The fuel cell system of claim 6, wherein the fuel supply unit comprises a fuel tank adapted to store the fuel, and a fuel pump adapted to produce the fuel from the fuel tank to the reformer.

8. The fuel cell system of claim 7, wherein the reformer comprises a fuel injection port through which the fuel supplied by the fuel pump is injected, and the fuel tank and the fuel injection port communicate with one another through a first supply line.

9. The fuel cell system of claim 6, wherein the oxygen supply unit comprises at least one air pump.

10. The fuel cell system of claim 9, wherein each of the stack and the carbon monoxide purifier comprises an air injection port through with the air supplied by the air pump is injected, and the air injection port of the stack and the air pump communicate with one another through a first supply line, and the air injection port of the carbon monoxide purifier and the air pump communicate with one another through a second supply line.

11. The fuel cell system of claim 10, wherein the carbon monoxide purifier comprises a reforming gas discharge port which discharges the reforming gas of which the concentration of carbon monoxide has been substantially reduced, and the stack comprises a reforming gas injection port through which the reforming gas is injected, and the reforming gas discharge port and the reforming gas injection port communicate with one another through a third supply line.

12. The fuel cell system of claim 5, wherein the moisture discharge port of the stack and the first inlet port of the non-reactive fuel dissolution apparatus communicate with one another through a first supply line.

13. The fuel cell system of claim 5, wherein the reforming gas discharge port of the reformer and the second inlet port of the non-reactive duel dissolution apparatus communicate with one another through a first supply line.

14. The fuel cell system of claim 13, wherein the reforming gas injection port of the carbon monoxide purifier and the discharge port of the non-reactive fuel dissolution apparatus communicate with one another through a second supply line.

15. An unreformed fuel dissolution apparatus for a fuel cell system, the apparatus comprising a dissolution container having a space configured to receive moisture from a fuel cell stack of the fuel cell system, wherein the dissolution container is configured to receive reformed gas and unreformed gas from a reformer and to dissolve the unreformed gas into the moisture, the dissolution container being configured to deliver the reformed gas to a carbon monoxide purifier.

* * * * *

UNITED STATES PATENT AND TRADEMARK OFFICE
CERTIFICATE OF CORRECTION

| | | |
|---|---|---|
| PATENT NO. | : 7,727,648 B2 | Page 1 of 1 |
| APPLICATION NO. | : 11/365106 | |
| DATED | : June 1, 2010 | |
| INVENTOR(S) | : In-Hyuk Son et al. | |

It is certified that error appears in the above-identified patent and that said Letters Patent is hereby corrected as shown below:

Column 9, Claim 10, line 10          Delete "with" Insert -- which --

Signed and Sealed this
Twenty-third Day of August, 2011

David J. Kappos
*Director of the United States Patent and Trademark Office*